US007056217B1

(12) United States Patent
Pelkey et al.

(10) Patent No.: US 7,056,217 B1
(45) Date of Patent: Jun. 6, 2006

(54) MESSAGING SERVICE FOR VIDEO GAME SYSTEMS WITH BUDDY LIST THAT DISPLAYS GAME BEING PLAYED

(75) Inventors: Casey J. Pelkey, Medina, WA (US); Darren C. Smith, Sammamish, WA (US)

(73) Assignee: Nintendo Co., Ltd., Kyoto (JP)

( * ) Notice: Subject to any disclaimer, the term of this patent is extended or adjusted under 35 U.S.C. 154(b) by 15 days.

(21) Appl. No.: 09/724,908

(22) Filed: Nov. 28, 2000

Related U.S. Application Data

(60) Provisional application No. 60/208,060, filed on May 31, 2000.

(51) Int. Cl.
*A63F 13/00* (2006.01)

(52) U.S. Cl. .......................... 463/43; 463/25; 463/29; 463/42

(58) Field of Classification Search .................... 463/1, 463/40–43, 25, 29
See application file for complete search history.

(56) References Cited

U.S. PATENT DOCUMENTS

| 5,324,035 | A | | 6/1994 | Morris et al. ............ 273/138 A |
| 5,347,306 | A | | 9/1994 | Nitta ............................ 348/15 |
| 5,393,073 | A | * | 2/1995 | Best ................................ 463/1 |
| 5,558,339 | A | | 9/1996 | Perlman ...................... 463/42 |
| 5,663,717 | A | * | 9/1997 | DeLuca ................. 340/825.36 |
| 5,768,382 | A | | 6/1998 | Schneier et al. .............. 380/23 |
| 5,795,228 | A | | 8/1998 | Trumbull et al. ............. 463/42 |
| 5,879,236 | A | | 3/1999 | Lambright .................... 463/42 |
| 5,880,731 | A | * | 3/1999 | Liles et al. ................. 345/758 |
| 5,956,485 | A | | 9/1999 | Perlman ................ 395/200.34 |
| 5,960,173 | A | * | 9/1999 | Tang et al. ................. 709/201 |
| 5,964,660 | A | | 10/1999 | James et al. ................... 463/1 |
| 5,971,849 | A | | 10/1999 | Falciglia ...................... 463/16 |
| 5,984,786 | A | | 11/1999 | Ehrman ....................... 463/42 |
| 5,987,376 | A | | 11/1999 | Olson et al. ................ 701/201 |
| 5,999,932 | A | | 12/1999 | Paul ............................ 707/10 |
| 6,009,458 | A | | 12/1999 | Hawkins et al. ............ 709/203 |
| 6,018,766 | A | | 1/2000 | Samuel et al. .............. 709/218 |
| 6,023,729 | A | | 2/2000 | Samuel et al. .............. 709/228 |
| 6,052,372 | A | | 4/2000 | Gittins et al. ............... 370/396 |
| 6,061,722 | A | | 5/2000 | Lipa et al. .................. 709/224 |
| 6,062,991 | A | | 5/2000 | Moriarty et al. ............ 473/407 |
| 6,078,948 | A | | 6/2000 | Podgorny et al. ........... 709/204 |
| 6,125,386 | A | | 9/2000 | Cho ........................... 709/205 |
| 6,134,590 | A | | 10/2000 | Perlman ..................... 709/228 |

(Continued)

FOREIGN PATENT DOCUMENTS

EP          0 821 536     *   1/1998

(Continued)

OTHER PUBLICATIONS

First Internet Backgammon Server. Publication [online]. FIBS, 1994 [retrieved on Sep. 17, 2002]. Retrieved from the Internet: <URL:www.fibs.com/guide.html>.*

(Continued)

*Primary Examiner*—John M. Hotaling, II
(74) *Attorney, Agent, or Firm*—Nixon & Vanderhye, P.C.

(57) ABSTRACT

A messaging system includes a web server computer and at least two video game systems. Each game system is configured to connect to the web server computer via the Internet and to communicate status data indicative of an activity engaged in by a user thereof. The web server computer generates a session file indicative of user status and the status of each of two or persons on a buddy list of the user.

22 Claims, 11 Drawing Sheets

U.S. PATENT DOCUMENTS

| | | | |
|---|---|---|---|
| 6,352,479 B1 * | 3/2002 | Sparks, II | 463/29 |
| 6,449,344 B1 * | 9/2002 | Goldfinger et al. | 379/88.17 |
| 6,463,471 B1 * | 10/2002 | Dreke et al. | 709/224 |
| 6,496,851 B1 * | 12/2002 | Morris et al. | 709/204 |
| 6,677,968 B1 * | 1/2004 | Appelman | 345/853 |
| 6,691,162 B1 * | 2/2004 | Wick | 709/224 |
| 6,716,103 B1 * | 4/2004 | Eck et al. | 463/45 |

FOREIGN PATENT DOCUMENTS

| | | |
|---|---|---|
| WO | WO 93/23125 | * 11/1993 |

OTHER PUBLICATIONS

Ad potential driving messaging war. Publication [online]. USA Today, 1999 [retrieved on Sep. 17, 2002]. Retrieved from the Internet: <URL:www.usatoday.com/life/cyber/tech/ctf683.htm>.*

For Instant Success, Add Instant Messaging. Publication [online]. Byte.com, 1999 [retrieved on Sep. 17, 2002]. Retrieved from the Internet: <URL:www.byte.com/documents/s=215/byt1999111s0010/index.htm>.*

Instant Messaging Guide. Publication [online]. Views.com, 1996 [retrieved on Aug. 1, 2002]. Retrieved from the Internet: <URL:www.viewz.com/features/imprint.htm>.*

AOL Instant Messenger (SM) Help, 1999, America Online, Inc., Version 3.0.1464, see entire document.*

ICQ: A user's guide. Publication [online]. Rose Vines, 1999 [retrieved on May 8, 2003]. Retrieved from the Internet: <URL:www.geekgirls.com/net_icq_guide.htm>.*

FIBS-Original announcement. Publication [online]. Backgammon Galore, Jul. 19, 1992 [retrieved on May 8, 2003]. Retrieved from the Internet: <URL:www.bkgm.com/rgb/rgb.cgi?view+229>.*

FIBS/W screenshots and help, 1995, Robin Davies, Version 1.35, see entire document.*

* cited by examiner

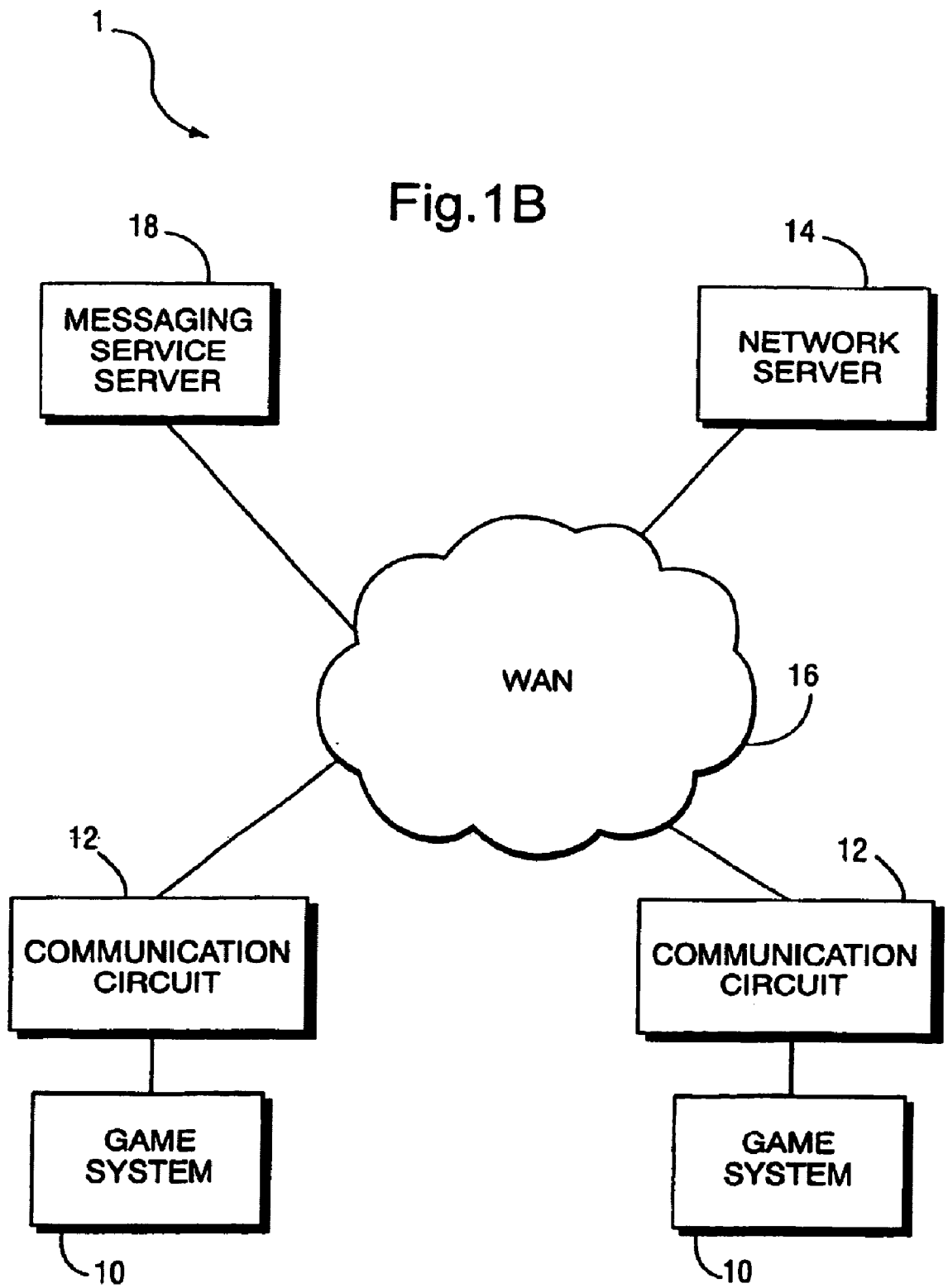

| | |
|---|---|
| Username: | Johnsmith |
| Alias: | Pikachu |
| First Name: | John |
| Last Name: | Smith |
| Gender: | Male |
| Age: | 11 |
| City: | Redmond |
| State: | Washington |
| Favorite Game: | Zelda 64 |
| Favorite Food: | Pizza |
| Favorite Sport: | Football |
| Hobbies: | Videogames, Football, Chat |
| Recommended URL: | http://www.nintendo.com |
| Notes: | If you ever want to challenge me to a game of Extreme Football, I usually play every Saturday night. |

Fig.5

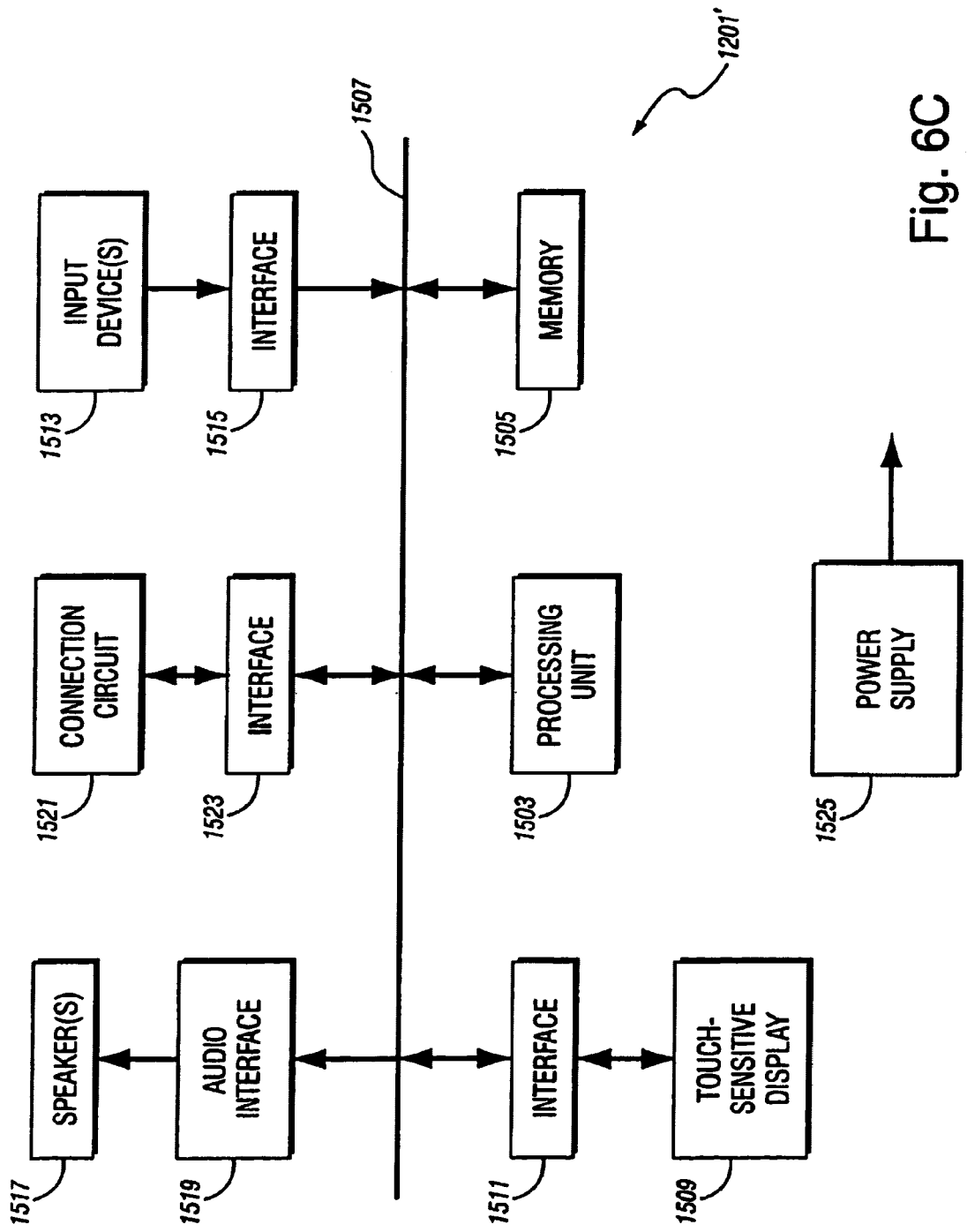

MESSAGING SERVICE FOR VIDEO GAME SYSTEMS WITH BUDDY LIST THAT DISPLAYS GAME BEING PLAYED

RELATED APPLICATION

This application claims priority from provisional Application No. 60/208,060, filed May 31, 2000, the contents of which are incorporated herein.

TECHNICAL FIELD

The present invention generally relates to a messaging service and, more particularly, to a messaging service for communicating messages between and among users of video game systems.

BACKGROUND AND SUMMARY OF THE INVENTION

Video and computer game systems have been known for quite some time. Typically, these game systems include a game machine housing a processing unit and associated hardware for running a game program, and include a display for displaying images of the game. The game program is typically contained in a game program memory, such as, for example, a semiconductor memory (e.g., ROM, EPROM, etc.) that is part of a removable cartridge or other removable device. By storing the game program in a removable cartridge, the user is allowed to conveniently and easily change the game being played, by simply exchanging the cartridge with one containing a different game. Examples of such game systems are the "N64®" and "Game Boy® Color" products.

The video gaming industry has recently looked to take advantage of the increasing popularity of the Internet by providing, among other things, online video games. The present invention extends the online capabilities of game systems by providing a messaging service that, among other things, enables users of video game systems to communicate with each other over the Internet or some other wide or local area network. A messaging service client is implemented by program code contained in an application (e.g., a video game, a web browser) executed by the game system. The application containing the program code for the messaging service client may be stored in a removable game cartridge. In other instances, some or all of the program code for the messaging service client may be stored in some other memory such as a memory associated with a communications circuit (e.g., modem) for establishing the network connection. In this case, the application stored in the removable game cartridge may include program code for accessing program code stored in these other memories. The messaging service can be provided even though video game systems typically do not have a multi-tasking desktop on which a messaging service client may reside. In addition, messages can be communicated between users of video game systems even though those users are engaged in different activities. For example, a user A playing video game A is able to communicate with a user B even if user B is playing a video game B. User A can in fact communicate with user B even if user B is not playing a video game at all and is, for example, browsing the Internet using a web browser program executed by user B's video game system.

In accordance with one particular aspect of the present invention, a user of the messaging service can send so-called "instant messages" via the Internet to other users of the messaging service. The user is able to create a list of associated friends or "buddies" that the messaging service identifies and ascertains the status of whenever the user connects online using a game system equipped with an appropriate communications circuit. "Connects online" refers to any Internet connection including, but not limited to, game playing and web browsing. The online connection may, for example, be to a game network server that itself provides the messaging service. In another arrangement, the messaging service may involve a messaging service network server that is separate from the game network server. The present invention is not limited in this respect.

The messaging service described herein provides many desirable features. For example, instant message services currently used with personal computers (such as AOL Instant Messenger and MSN Messenger) offer users the capability of communicating with other users, but do not automatically provide information that identifies what other users are doing (e.g., playing a game, web browsing, etc.). In addition, the messaging service of the present invention enables users of game systems to communicate with each other even if those users are engaged in different activities such as playing different games.

Still other features and advantages of the present invention will become more apparent from the following detailed description when read in conjunction with the accompanying drawings.

BRIEF DESCRIPTION OF THE DRAWINGS

FIGS. 1A and 1B each provides an illustration of an example game network in which the messaging service of the present invention may be implemented.

FIG. 5 illustrates a user profile.

FIG. 6C illustrates another example emulation host system.

DETAILED DESCRIPTION OF EXAMPLE EMBODIMENTS

The present invention is described in the context of exemplary embodiments. However, the scope of the invention is not limited to the particular embodiments described in the specification. Rather, the description merely serves to illustrate the principles and characteristics of the present invention. Those skilled in the art will recognize that various modifications and refinements may be made without departing from the spirit and scope of the invention.

Figure 1A:
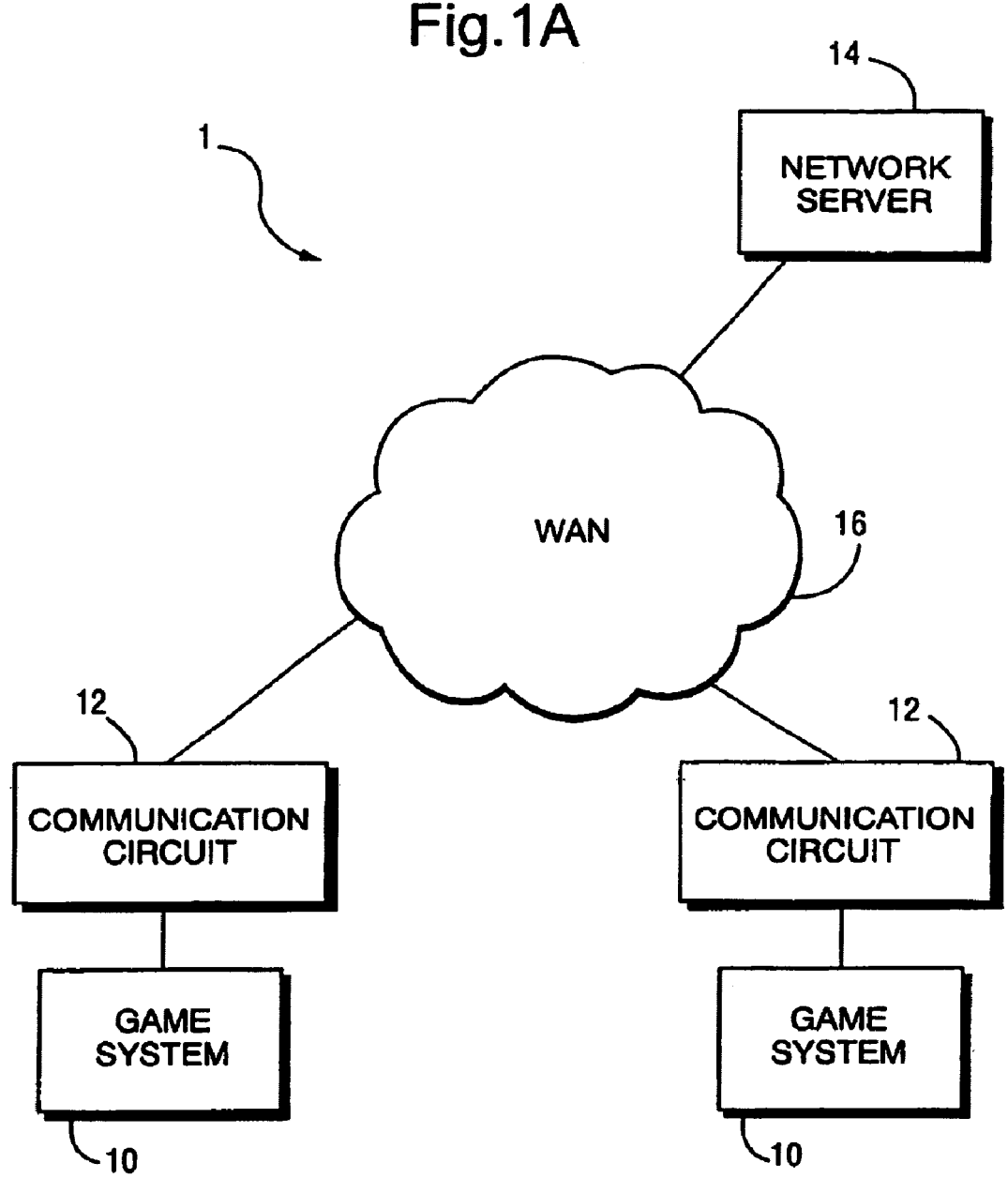

FIG. 1A provides an illustration of a network 1 in which the messaging service described herein may be implemented. Network 1 includes game systems 10 connected via communications circuits 12 (e.g., modems, network interfaces, etc.) to a wide area network 16 such as the Internet. Game systems 10 typically execute applications in a non-multi-tasking manner, i.e., applications run one at a time. Although communications circuits 12 are shown in FIG. 1 as being external to game systems 10, it will be appreciated that these circuits may be provided internally to the game system or embodied as cartridges, cards, or other such circuits removably attachable to a port or bay of the game systems. Also connected to wide area network 16 is a network server 14. Among other things, network server 14 stores games that may be played by users of the network. These games may be one player games or multi-player games. The multi-player games may involve competition between two or more users or may involve competition between a user and a server-generated opponent. Network server 14 also provides the messaging service described in greater detail below. Thus, in the network of FIG. 1A, the network provider may use the network server to provide the messaging service.

The present invention is not limited to the messaging service being provided by the network provider and/or by using the network server. For example, a messaging service provider may work out an arrangement with the network provider to provide a messaging service using the network server. Also, a messaging service provider separate and independent from the network provider may provide the messaging service using a messaging service server that is separate from the network server as shown in FIG. 1B. That is, while FIG. 1A shows a network server that provides both game services and the messaging service, these services may in fact be provided by separate servers, i.e., a network server 16 and a messaging service server 18 as shown in FIG. 1B. Although the description below is with reference to the arrangement shown in FIG. 1A in which the messaging service is provided by a network provider using network server 14, the description is also readily applicable to these other arrangements including the arrangement shown in FIG. 1B.

What follows are descriptions of two game systems that may be used as the game systems 10 shown in FIGS. 1A and 1B. The descriptions of these game systems are provided by way of illustration, not limitation, and it will be readily recognized that other game systems may be used in a network such as the networks shown in FIGS. 1A and 1B.

Figure 2:
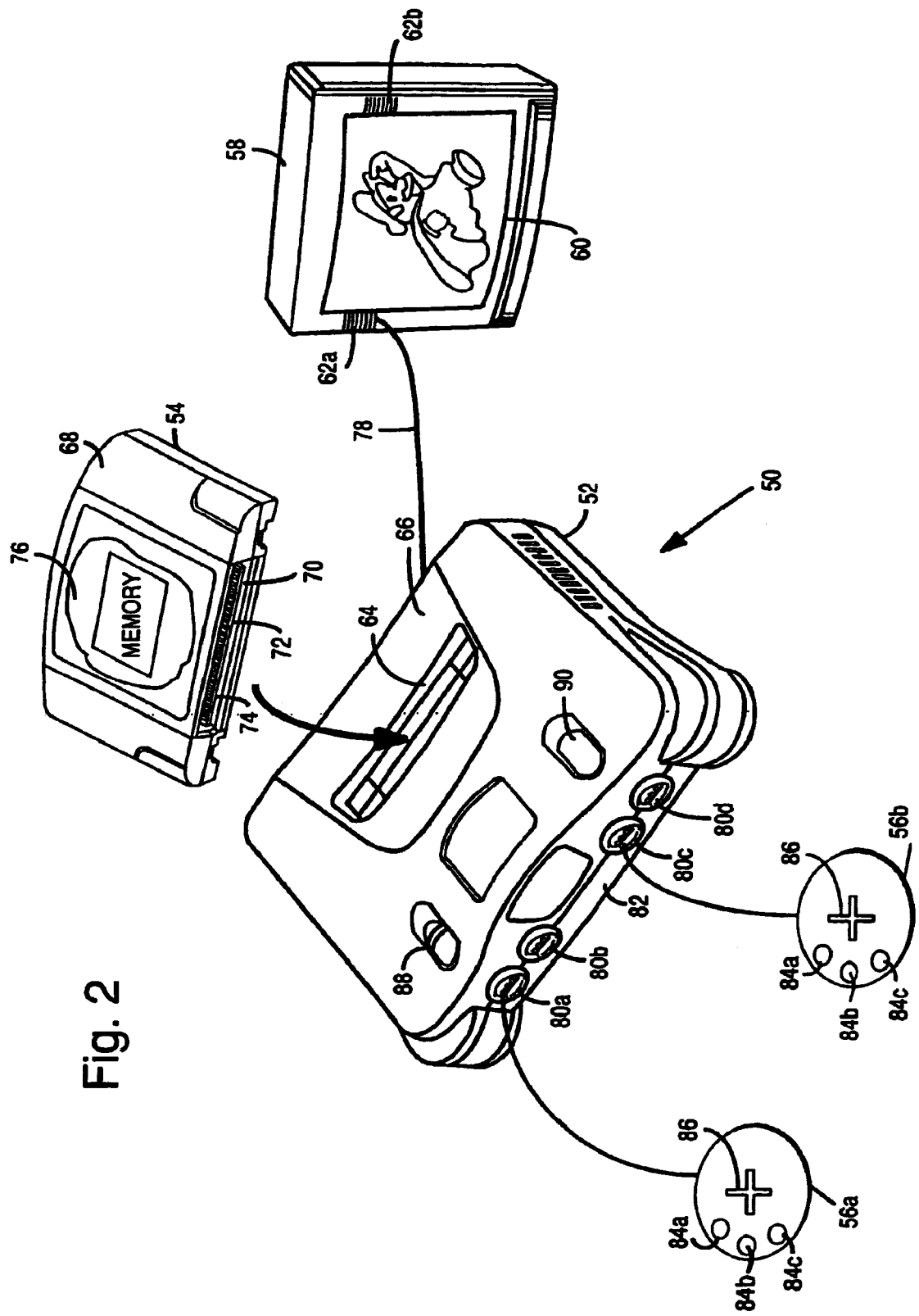
FIG. 2 shows a game console system 50 that may constitute one of the game systems 10 shown in FIG. 1.

FIG. 2 shows a game console system 50 that may constitute one of the game systems 10 shown in FIGS. 1A and 1B. Video game system 50 that includes a main console 52, a video game storage device 54, and handheld controllers 56a and 56b (or other user input devices). Video game system 50 may be, for example, the N64® video game system. Main console 52 is connected to a conventional home color television set 58. Television set 58 displays three-dimensional (3-D) video game images on its television screen 60 and reproduces stereo sound through its speakers 62a and 62b.

Video game storage device 54 is typically in the form of a replaceable memory cartridge insertable into a slot 64 on a top surface 66 of console 52. A wide variety of alternative semiconductor, optical and magnetic program storage media such as CD ROMs, DVDs, floppy disks, and the like may be utilized. Video game storage device 54 may, for example, comprise a plastic housing 68 encasing a printed circuit board 70. Printed circuit board 70 has an edge 72 defining a number of electrical contacts 74. When the video game storage device 54 is inserted into main console slot 64, the cartridge electrical contacts 74 mate with corresponding "edge connector" electrical contacts within the main console. This action electrically connects the storage device printed circuit board 70 to the electronics within main console 52. At least a memory 76 is disposed on printed circuit board 70 within storage device housing 68. Memory 76 includes a read only memory (ROM) and possibly a read/write memory (e.g., an EEPROM). The ROM stores instructions and other information pertaining to a particular video game. The ROM of a memory 76 for one game cartridge storage device 54 may, for example, contain instructions and other information for an adventure game while the ROM of a memory 76 of another storage device 54 may contain instructions and information to play a car race game, an educational game, etc. To play one game as opposed to another game, the user of video game system 50 need only plug the appropriate storage device 54 into main console slot 64—thereby connecting the storage device's memory 76 (and any other circuitry it may contain) to console 52. This enables a computer system embodied within console 52 to access the information contained within the ROM of memory 76, which information controls the console computer system to play the appropriate video game by displaying images and reproducing sound on color television set 58 as specified under control of the ROM game program information.

Data may be written to and read from a read/write memory of memory 76 by the computer system embodied within console 52. This data may include, but is not limited to, game scores and game levels.

The user may connect up to four controllers to corresponding connectors (sockets) 80a–80d on main unit front panel 82. Two controllers 56a and 56b are shown in FIG. 2. Controllers 56a and 56b may take a variety of forms. For example, each of controllers 56a and 56b shown in FIG. 2 include various function controlling push buttons such as 84a–c and an X-Y switch 86 used, for example, to specify the direction (up, down, left or right) that a player-controllable character displayed on television screen 60 should move. Other controller possibilities include joysticks, mice pointer controls and a wide range of other conventional user input devices.

In use, a user selects a storage device 54 containing a desired video game, and inserts that storage device into console slot 64 (thereby electrically connecting memory 76 and other cartridge electronics to the main console electronics). The user then operates a power switch 88 to turn on the video game system 50 and operates controllers 56a and/or 56b to provide inputs to console 52 and thus control video game play. For example, depressing one of push buttons 84a–c may cause the game to start playing. Moving directional switch 86 may cause animated characters to move on the television screen 60 in controllably different directions. Depending upon the particular video game stored within the storage device 54, these various controls 84a–c and 86 on the controllers 56a and 56b can perform different functions at different times. If the user wants to restart game play from the beginning, or alternatively with certain game programs reset the game to a known continuation point, the user can press a reset button 90.

Additional details of game system 50 may be found in U.S. Pat. No. 6,022,274 the contents of which are incorporated herein.

Figure 3A:
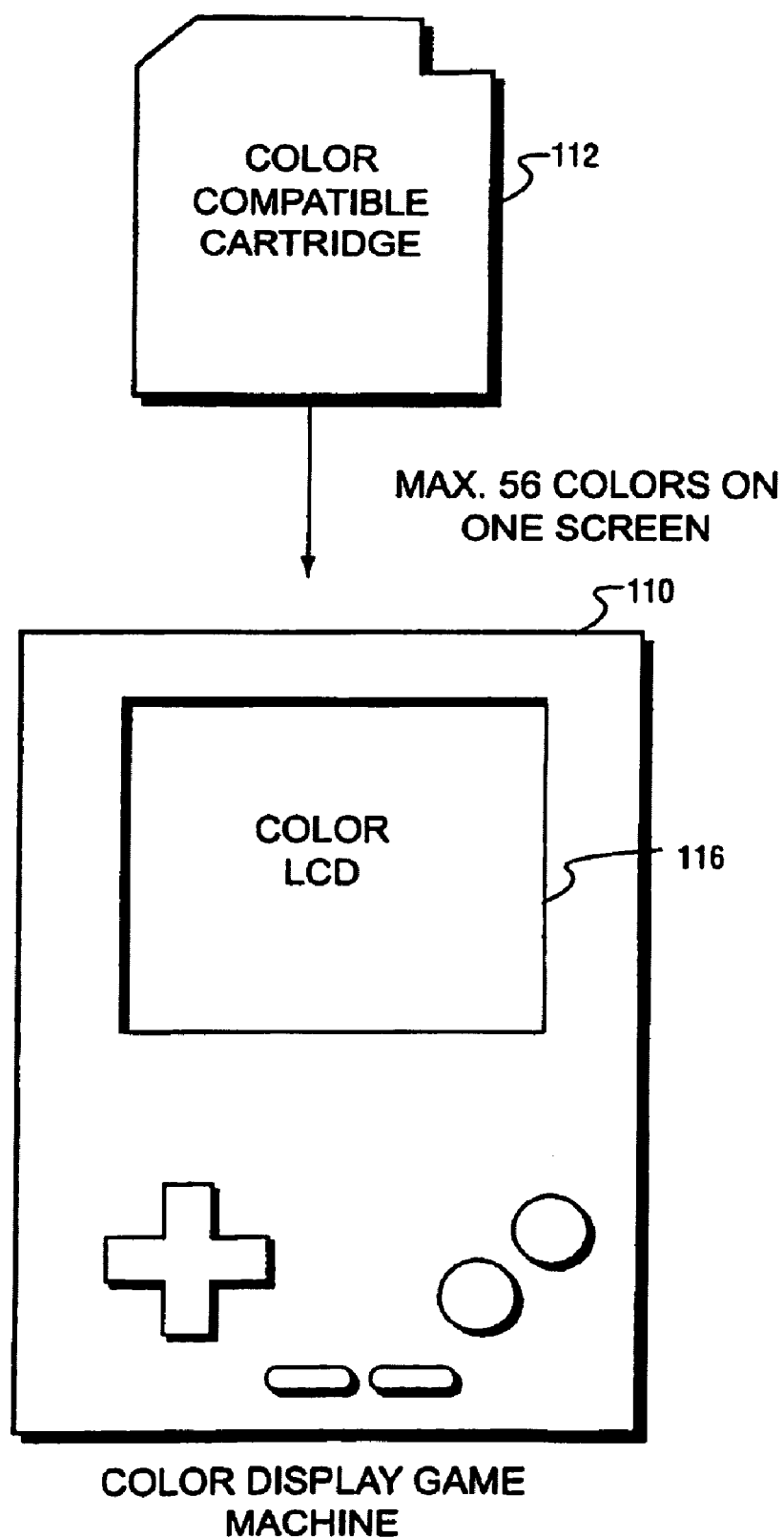
FIGS. 3A, 3B and 3C show a portable (hand-held) color-display game system 110 that may constitute one of the game systems 10 shown in FIG. 1.
Figure 3B:
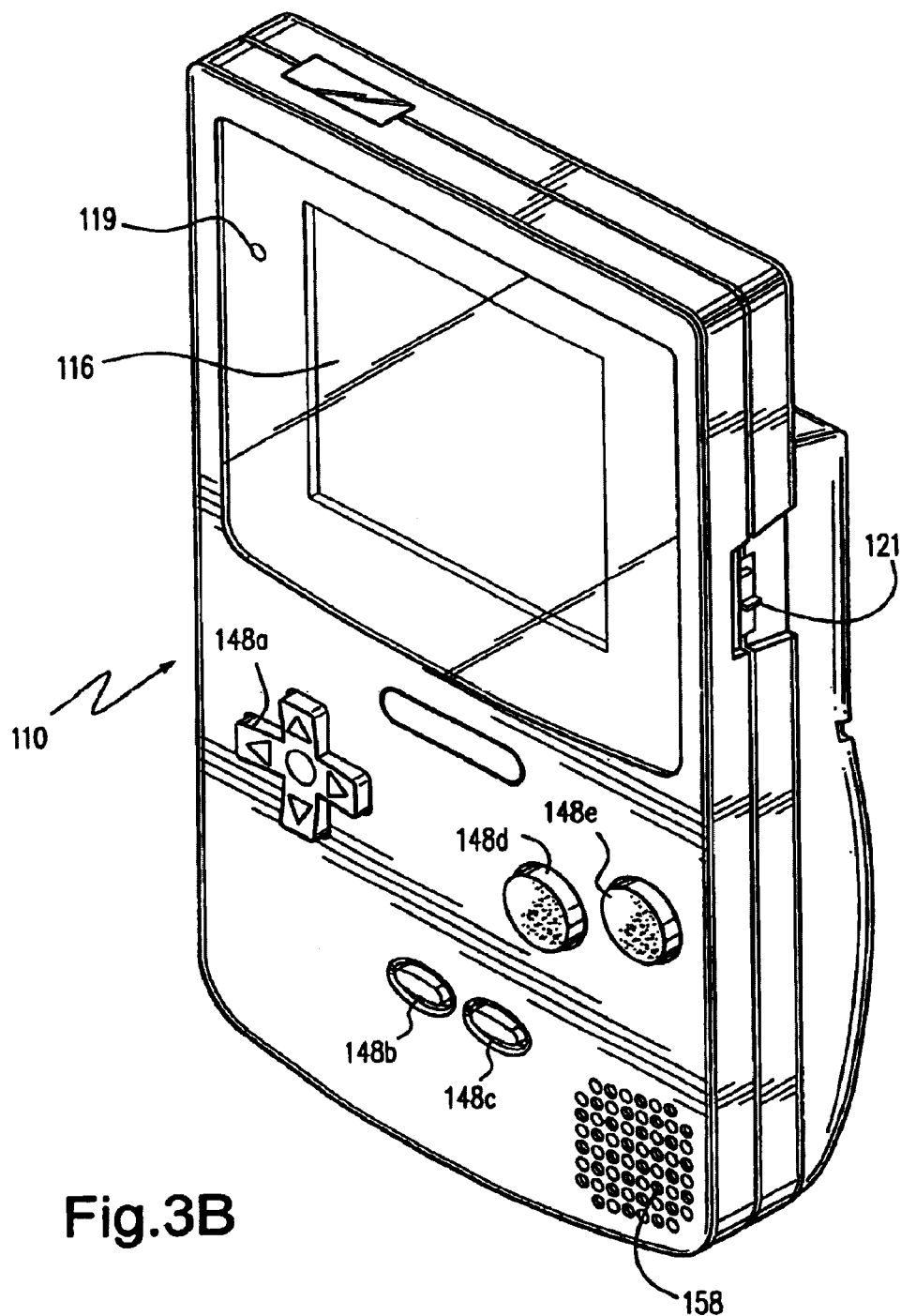
Figure 3C:
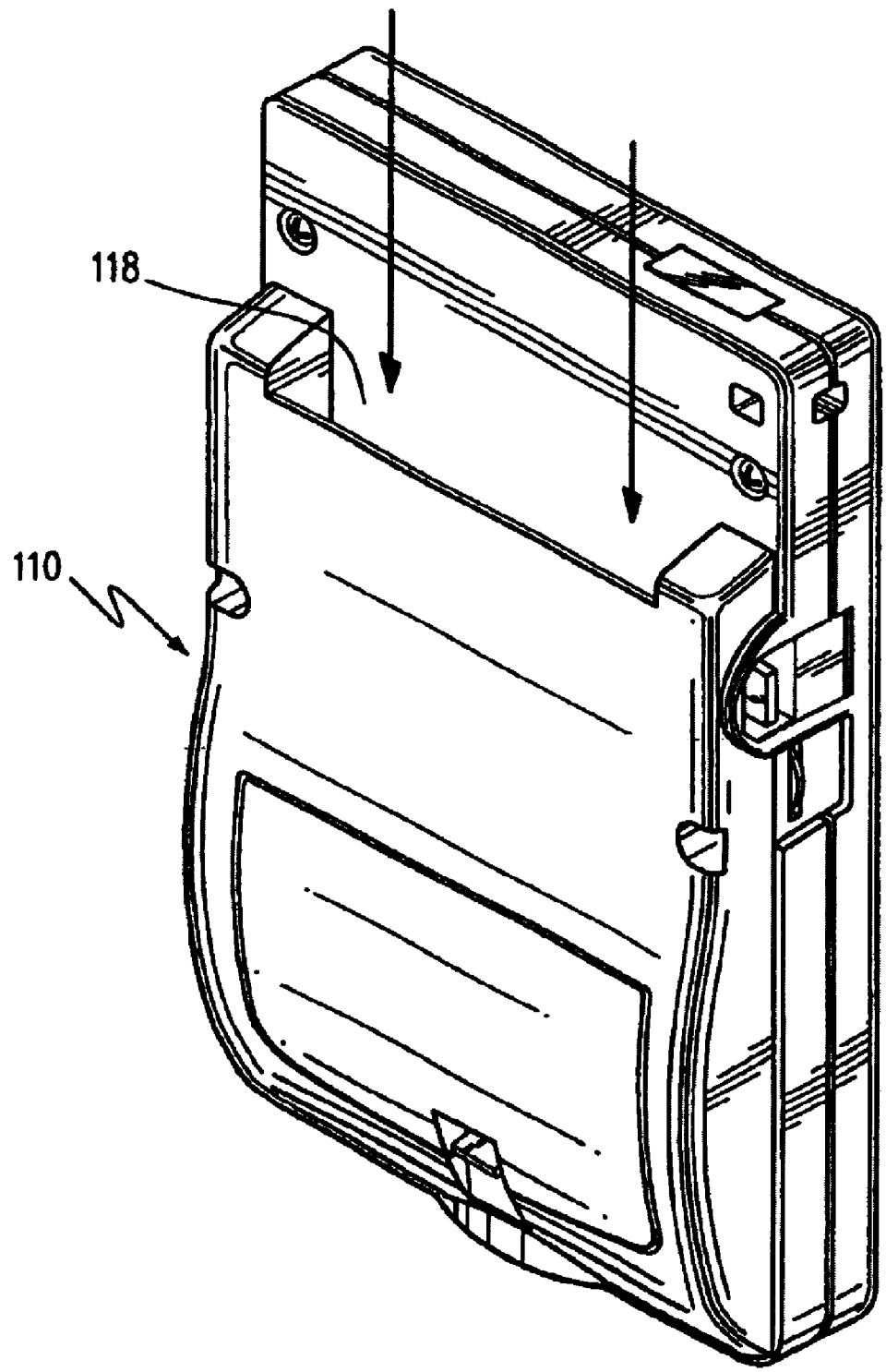

FIGS. 3A, 3B and 3C show a portable (hand-held) color-display game system 110 that may be used as one of the game systems 10 shown in FIGS. 1A and 1B. Game machine 110 displays game characters in color on a color liquid crystal display (LCD) 116 when a color-ready game cartridge 112 is selectively inserted into a game cartridge slot 118 (see FIG. 3C). The color LCD 116 displays characters using a plurality of different colors if the color-ready game cartridge 112 is inserted into the game system 110. Game system 110 may also be configured to receive monochrome game cartridges (not shown) and to display monochrome characters on LCD 116. Game system 110 may, for example, be a GameBoy® Color game system.

Figure 4:
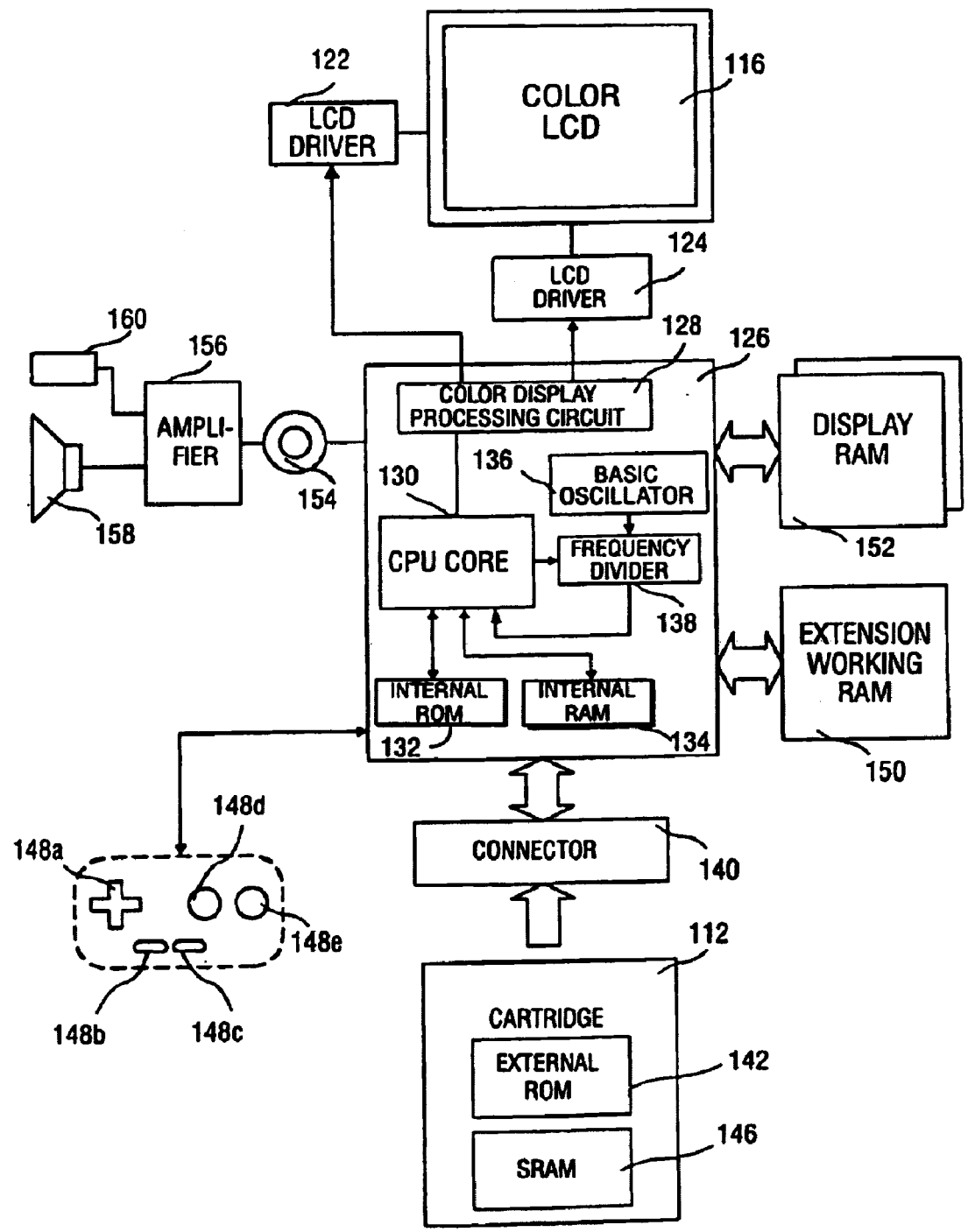
FIG. 4 is a detailed block diagram of the game machine 110 shown in FIGS. 3A–3C.

With reference to FIG. 4, game system 110 includes color LCD 116 as described above. Color LCD 116 is formed as a dot matrix display and is driven by LCD drivers 122 and 124 to display color images on its screen. LCD driver 122 selectively drives, for example, the rows of the dot matrix display and LCD driver 124 selectively drives, for example, the columns of the dot matrix display. LCD drivers 122, 124 are supplied with color image signals from a color display processing circuit 128 included in a central processing unit (CPU) 126.

CPU 126 further includes a CPU core 130 that is connected to an internal read only memory (ROM) 132 and an internal random access memory (RAM) 134. Internal RAM 134 is used as a work memory of CPU core 130. CPU 126 further includes a basic oscillator 136. Basic oscillator 136 is formed of, for example, a quartz oscillator, and supplies an oscillating signal to a programmable frequency divider 138. Programmable frequency divider 138 divides the oscillating signal from basic oscillator 136 in accordance with frequency division data from CPU core 130, and supplies a divided signal as a clock of CPU core 130.

A connector 140 is connected to CPU 126 by an appropriate bus. Game cartridge 112 is selectively attachable to connector 140. Game cartridge 112 is preferably in the form of a replaceable memory cartridge insertable into game cartridge slot 118 of game system 110. Game cartridge 112 may comprise a plastic housing that encases a printed circuit board. The printed circuit board has a connector defining a number of electrical contacts. When game cartridge 112 is inserted into game cartridge slot 118 of game system 110, the cartridge electrical contacts mate with corresponding "edge connector" electrical contacts within game system 110. This action electrically connects the printed circuit board contained within the plastic housing to the electronics within game system 110. In this example, the printed circuit board of game cartridge 112 at least includes a read-only memory (ROM) 142 and a read/write memory (e.g., SRAM) 146. ROM 142 stores instructions and other information pertaining to a particular video game. The ROM for one game cartridge 112 may, for example, contain instructions and other information for an adventure game while the ROM of another game cartridge 112 may contain instructions and other information for a car race game, an educational game, etc. To play a game, a user of game system 110 need only plug the appropriate game cartridge into game cartridge slot 118 of game system 110—thereby connecting the cartridge's ROM 142 (and any other circuitry it may contain) to game system 110. This enables the game machine circuitry to access information contained within ROM 142 (and read/write memory 146), which information controls the game system to play the appropriate video game by displaying images and reproducing sound as specified under control of the ROM game program information. Read/write memory 146 is used to store data such as game backup data.

CPU 126 is supplied with operation signals from operating keys 148a–148e. Operating key 148a is used, among other things, to move a game character displayed on color LCD 116 in four directions, that is, upward, downward, right and left. Operating key 148b is a select key that is used for, for example, game mode selection and the like. Operating key 148c is a start key that is used to start playing the game or to temporarily stop the progress of the game. Operating keys 148d, 148e are push-button switches. By pushing operating keys 148d, 148e, it is possible to cause various motions of the game characters displayed on color LCD 116, for example, a weapon use, a jump and the like. Operating keys 148a–148e are disposed in a forward surface of game system 110 as shown in FIG. 3B. A key matrix (not shown) is provided for sending CPU 126 the operation signals from operating keys 148a–148e as controller data.

Batteries (not shown) (e.g., 2 AA batteries) provide power for game system 110. A power indicator LED 119 (see FIG. 3B) may dim as the batteries lose their charge, thereby providing a visual indication to the user that new batteries are needed. Game system 110 may also be configured for connection to an AC adapter to permit extended use without batteries.

In accordance with the game program, character data supplied from game cartridge 112 and the controller data from operating keys 148a–148e, CPU 126 executes data processing and writes display data into a display RAM 152, using an extended RAM 150 when necessary. The display RAM 152 has two banks, that is, a first bank and a second bank, and has, as a whole, a storage area that is greater than the display area of color LCD 116, thereby enabling a scrolling display upward and downward and/or rightward and leftward on the screen of color LCD 116. As a result of the data processing by CPU 126, sound signals to be output are adjusted in level by volume control 154 and amplifier 156, and then outputted to a speaker 158 and/or an earphone jack 160. Sound signals output from speaker 158 and/or earphone jack 160 include game sound effects, voices and music.

Generally speaking, to use game system 110 to play a game, a user selects a game cartridge 112 containing a desired video game, and inserts that game cartridge into game cartridge slot 118 of game system 110, thereby electrically connecting ROM 142 and other cartridge electronics to game system 110. The user then operates a power switch 121 (see FIG. 3B) to turn on game system 110 and operates operating keys 148a–148e to control video game play. For example, depressing operating key 148c may cause the video game to start playing. Actuating operating key 148a may cause animated characters to move on color LCD 116 in controllably different directions.

Additional features of game system 110 may be found in U.S. Pat. No. 6,315,669 and U.S. Pat. No. 6,373,462, the contents of which are incorporated herein in their entirety.

In one illustrative implementation of the present invention, the program contained in storage device 54 and the program contained in cartridge 112 each includes program code for a messaging service client. Various features of the messaging service are described below.

User Registration

When the program code for the messaging service client is executed for the first time upon appropriate inputs from a user, the messaging service client prompts the user via the display of the game system to input his/her account username (e.g., Johnsmith). The username may be input using an input device associated with the game system. In the case of a game console such as the game console shown in FIG. 2, an on-screen keyboard may be provided and the game controls are usable to select characters from the on-screen keyboard to input the username. In another implementation, a separate keyboard may be connected to the game console. In the case of a portable game system such as the portable game system shown in FIGS. 3 and 4, an on-screen keyboard may be used to input the username. In the event that a household has more than one user, multiple usernames may be stored. In this case, the messaging service client may be configured with a screen that allows a user to select an appropriate one of a plurality of usernames before going online.

Game network server 14 maintains a list of registered usernames. The usernames are checked to confirm that a particular user is a registered user of the messaging service prior to granting that user access to the messaging service. If a user cancels his/her account, network server 14 updates the list of registered usernames list to reflect the change.

User Profile

The messaging service client provides the user with an opportunity to create a user profile that is stored in the memory of network server 14. As mentioned below, a copy of this profile may be (but is not required to be) maintained locally at the game system. The user profile may contain any desired user-specific information including, but not limited to, an alias, first name, last name, gender, age, city, state, favorite game, favorite food, favorite sport, hobbies, recommended URL and notes. FIG. 5 illustrates an example user profile for John Smith.

If desired, users may also be given an opportunity to indicate high scores and other accomplishments achieved on the game network or on stand-alone games. Users may also be provided with the capability of including in their profiles customized faces (images) made up of various user-selected features (e.g., a particular nose, mouth, mustache, etc.) in order to enhance the "persona" of the user. These customized faces may be included with messages. Users may even be provided with the capability of including in their profiles digital images of their own faces generated, for example, using a digital camera such as the one described in U.S. Pat. No. 6,435,969, the contents of which are incorporated herein.

Buddy List

The messaging service client allows the user to create a list ("buddy list") of other users ("buddies") with whom he/she wishes to remain in contact. This buddy list is stored by network server 14 and a copy may also be stored locally. When a user ("connecting user") connects to the game network, he/she is connected to network server 14 and is logged in by the messaging service as being online and as being engaged in a particular activity on a particular type of game system. For example, the user may be logged in as playing Pokemon® Pinball on a GameBoy® Color portable game system. In another example, the user may be logged in as browsing the Internet. In addition to being logged in, the messaging service on network sever 14 determines whether the connecting user has a buddy list. If so, network server 14 determines the status of the buddies on this buddy list (e.g., which buddies are currently online and the activities in which these buddies are engaged). The user can if desired view a listing showing which of his/her buddies are online and the activities in which those buddies are engaged. The connecting user and his/her buddies can then communicate with each other on an individual basis and private chat sessions can be set up. These chat sessions are typically text-based, but it also possible to set up voice over Internet sessions between two users. Network server 14 periodically updates the status of the buddies on the buddy list to reflect buddies that have gone offline, are playing different games, have come online, etc.

Significantly, as long as a user is connected to network server 14, that user can connect to his/her buddies even if the user is engaged in an activity different than the activities of his/her buddies. Thus, for example, the messaging service provides for instant messages between one user browsing the Internet and another user playing a game. The messaging service also provides for instant messages between one user playing game A and another user playing game B. Of course, browsing and game-playing are merely illustrative and it will be recognized that the messaging service described herein may be used to provide instant messages between users of other applications such as productivity applications.

Before a user can add another user to his/her "buddy" list, the new buddy must approve the addition. Thus, the messaging service notifies the new buddy to request the new buddy's approval for addition onto the user's buddy list. Access is granted or denied only after the new buddy accepts or declines his/her addition to the buddy list. During the approval process, the messaging service identifies whether or not the new buddy is a registered user of the service.

If the buddy accepts, his/her username remains on the buddy list. If the buddy declines, he/she is removed from the buddy list. If the messaging service determines that the new buddy is not a registered user, the name is removed from the list and the messaging service prompts the user to check the spelling of the name.

As an example, a first user may request that a second user join her list. Network server 14 sends a message to the second user extending an invitation to the second user to join the first user's buddy list. The second user may accept or decline the invitation. If the second user accepts, the second user is added to the first user's buddy list. Also, at this time, the first user is preferably added to the second user's buddy list.

At any time, a buddy can elect to remove his/her name from another user's buddy list. In this case, the user is notified and the name of the buddy is removed from his/her buddy list.

View Association List

The messaging service client enables a user to access network server 14 to view which other users have included him/her on their buddy list. At any time, a user can remove his/her name from another user's buddy list. In this case, the other user is notified and the user's name is removed that particular list.

Block List

In the event that a user does not wish to be notified of a request to be placed on some other user's buddy list, the messaging service client enables the user to access network server 14 to add the name of that other user to a Block List listing the usernames of those other users that he/she does not wish to hear from.

User Preferences

The messaging service client enables a user to set and modify certain preferences at any time.

Profile

The user can set a preference to determine whether (1) everyone can see his/her user profile, (2) only buddies can see his/her user profile, (3) or no one can see his/her user profile. The administrator of the messaging service may also provide certain limitations on the access to user profiles by users of the messaging service in order to protect user privacy.

The profiles may also specify how much information may be provided to any or all buddies on his buddy list. This specification may be made by a user, a user's parent or guardian or an administrator of the messaging service. This feature may be provided to, among other things, protect the amount of online information that is available to others about children. Thus, for example, a user may specify in his profile that a particular buddy cannot see what the user is doing. That is, the user my specify that a particular buddy may know that the user is online, but not be able to determine the activity in which the user is engaged. The user may also specify that a particular buddy can know only certain activities in which the user is engaged (e.g., playing a particular game or games).

Access

The user can set a preference to determine whether (1) everyone can search for him/her, (2) only allow buddies to search for him/her, or (3) no one can search for him/her. The administrator of the messaging service may also provide certain limitations on searching for other users in order to protect user privacy.

Status

The user can set his/her status to be (1) available—able to send/receive messages, (2) invisible—online, but not able to send/receive messages, (3) busy—online, able to send, but not receive messages. A user can, for example, broadcast a message that he/she is online but does not want to be interrupted. A busy icon may be used to notify others that the user is online, but does not want to be bothered. A user can also be invisible; such a user is online and can determine what his/her buddies are doing, but the buddies don't know that the user is there.

Rules

A user can create a list of rules that can be selectively turned ON or OFF. For example, a user may have an Auto Reply rule that can be turned ON or OFF. When the user sets his/her status to busy, the Auto Reply rule may be invoked to generate a personal auto reply message that automatically informs a message sender of the user's status.

Alerts

Alerts may be audible and/or visual and include:

Message Alerts that alert a user when a new message is received

E-mail Notification Alerts that alert a user when his/her mailbox receives a message. That is, a user's e-mail service may be configured to send a notification to the messaging service client when an e-mail message is received by the e-mail service. The notification may include an identification of sender. The user can set a preference determining whether the messaging service client generates an audible and/or visual alert upon receipt of such a notification. In response to the alert, a user can if desired launch an e-mail client to read the e-mail message. The e-mail server may be separate from the game network server and/or the messaging service server.

Buddy Signs On Alerts that alerts a user when any buddy (or some particular buddy) signs on.

Buddy Signs Off Alerts that alert a user when any buddy (or some particular buddy) signs off.

Reminder Alerts that remind a user of some event or activity (e.g., "Television program X starts in 5 minutes.")

Autostart Alerts alert the user that the messaging service client starts whenever the user goes online A user accesses the game network via the communications circuit 12 connected to the user's game system 10. Communications circuit 12 may, for example, be a modem connected to a port (e.g., PCMCIA, USB, serial, and the like) of the game machine. If desired, the modem may include an associated memory. This memory may be used to store, among other things, a dialer, a browser, an e-mail client, an address book (e.g., telephone numbers for point-to-point communications, ISP access, etc.) and the like. The memory may also be used to store a user's profile, buddy list, and/or preferences and, in some cases, some or all of the program code for the messaging service client. Updates and changes may be made to the information in this memory.

Profile, buddy list and/or preference information that is also stored in memory of network server 14 may be updated to reflect any "off line" updates or changes the next time the user accesses the server. Some of the memory may also be used as a cache. For example, if during game play the message from another user forwards an URL, the cache may be used to store the URL until the user can conveniently pause or stop game play.

The present invention is not limited to any particular allocation of program code and data to specific memories provided that the program code and data is accessible to system components as needed to implement the functionality described herein. Thus, for example, the dialer may be part of program code stored in a game cartridge. If the game system has access to external storage such as a hard drive or an optical disk, the dialer, browser, address book, etc. may be stored using this external storage.

Access to the game network may be initiated when the user uses a cartridge having program code that includes code for the messenger service client. The cartridge may, for example, be a cartridge such as cartridge 54 used with the game system 50 shown in FIG. 2 or a cartridge such as cartridge 112 used with the portable game system 110 shown in FIGS. 3A–3C and 4. In addition to the code for the messaging service client, the cartridge contains program code executable by the processing circuitry of the game system for playing a game or for browsing the Internet. When the user logs onto the network (e.g., via the user's Internet service provider), the messaging service client is automatically initiated if "Autostart" is enabled in the user's preferences. In a manner transparent to the user, the messaging service client contacts the server providing the messaging service (e.g., network server 14) and reports the identity and status of the user (e.g., username and what game the user is playing on what type of machine). The messaging service generates a session file on network server 14 to manage the status of the user and the user's buddies. Each time a buddy logs on, logs off, changes activities, etc., the messaging service updates the session file. The messaging service client is configured to permit a user to access network server 14 to ascertain the status of his/her buddies. Alternatively or additionally, this status information may be periodically communicated to the messaging service client and stored (e.g., in a memory associated with the modem) for immediate or subsequent display on the display associated with the game system.

The interface for the messaging service may take many different forms and the present invention is not limited in this respect. The interface is generally dependent upon the activity in which the user is currently engaged. For example, one interface may be provided if the user is browsing the Internet and another different interface may be provided if the user is playing a game. The interface should not create an obtrusive or unfriendly feel.

The interface may include a master control panel indicating the status of all the buddies on a user's buddy list based on the status information maintained by network server 14. A user may access this control panel to determine the status of the buddies on his/her buddy list. A user may also designate in his/her preferences that a message be automatically generated when the status of particular buddy changes. Thus, the user may designate that a message be generated whenever user B goes online and/or whenever user B goes offline and/or whenever user B plays a particular game, etc.

Each of the game systems includes an input device(s) that is usable by a user to create messages. In the case of a game console, an on-screen keyboard may be used and the game controls are usable to select characters from the on-screen keyboard to create messages. In another implementation, a separate keyboard (not shown) may be connected to the game console. In still another implementation, the input device may be a microphone to enable voice over IP communications. Voice over IP may be implemented within the messaging service.

In the case of a portable game system, an on-screen keyboard may be used to create messages. If voice input is supported, a microphone may also be used.

The messaging service may be configured to support quick macro messages to help speed up conversations. The user can then create several messages that are accessible by pressing a button or key, or a sequence of buttons and/or keys. These macro messages might be common phrases such as "Do you want to challenge me?", "How are you doing?", or "I'm signing off, good-bye."

The messaging service client may be configured to provide users the option of remembering a username that he/she would like to add to his/her buddy list. This feature may be used, for example, if a user meets someone in a chat room and then wants to add that someone to his/her buddy list. As noted above, approval must be given by the buddy before he/she can be added to the user's buddy list. The messaging service client can also be configured to permit broadcast messages to be sent to two or more buddies on a buddy list.

As described above, a messaging service client may be included as part of applications executed by the game systems to allow messages to be communicated between users. The messaging service client allows two systems connected to the network server to each know that the other is online and permits private conversations between these parties. When the messaging service client is initiated, it notifies the network server that the user is online and the network server then determines the status of the user's buddies. The user can then review the status of his/her buddies. This status information may be accessed via an icon during game play and may be displayed before starting the game.

Among other things, the messaging service of the present invention enables users to let their friends know they are playing particular games without making pre-arrangements (e.g., via an e-mail saying "I'm playing game X on Tuesday night at 8.") The messaging service marks a user's location in the network world and permits other selected users to see what the user is doing (e.g., playing a particular game on a particular game machine, browsing the web, etc.) The messaging service permits private chats to be set up, even if users are engaged in different activities (e.g., playing different games).

It is preferable that the messaging service not interfere with game playing, particularly in the case of fast-action games. If there is sufficient bandwidth, some portion of this bandwidth may be dedicated to messaging service data. In situations where no dedicated bandwidth for messaging service data is available, the messaging service data is allocated bandwidth when this data can be "fit in" without affecting game playing. Thus, game playing data should take precedence over the message service data.

In addition, it is desirable that messages not be presented to the user in an intrusive manner. For example, messages may be presented to the user as the user is going from one game level to another. Alternatively or additionally, an indicator (e.g., a flashing envelope or a flashing microphone) may be displayed to indicate to the user that a message has been received.

Other Example Compatible Implementations

Certain of the above-described system components could be implemented as other than the home video game console system or hand-held system configurations described above.

An emulator system, for example, might include software and/or hardware components that emulate or simulate some or all of hardware and/or software components of the system for which the application software was written. For example, the emulator system could comprise a general-purpose digital computer such as a personal computer, which executes a software emulator program that simulates the hardware and/or firmware of the system. The emulator could also comprise a personal digital assistant (PDA) that simulates the hardware and/or firmware of the system. An emulator may execute the game software so that a particular game functions and/or appears somewhat differently from how it functions and/or appears on its intended platform. Thus, the emulator may show a color game in monochrome or a play a game without its accompanying sound. Emulation as used herein is intended to include emulation that results in these and other such differences in functions and/or appearance.

Some general purpose digital computers (e.g., IBM or MacIntosh personal computers and compatibles) are now equipped with 3D graphics cards that provide 3D graphics pipelines compliant with DirectX or other standard 3D graphics command APIs. They may also be equipped with stereophonic sound cards that provide high quality stereophonic sound based on a standard set of sound commands. Such multimedia-hardware-equipped personal computers running emulator software may have sufficient performance to approximate the graphics and sound performance of the system. Emulator software controls the hardware resources on the personal computer platform to simulate the processing, graphics, sound, peripheral and other capabilities of the portable game machine platform for which the game programmer wrote the game software. Similarly, PDAs running emulator software may have sufficient performance to approximate the graphics and sound performance of the system.

Figure 6A:
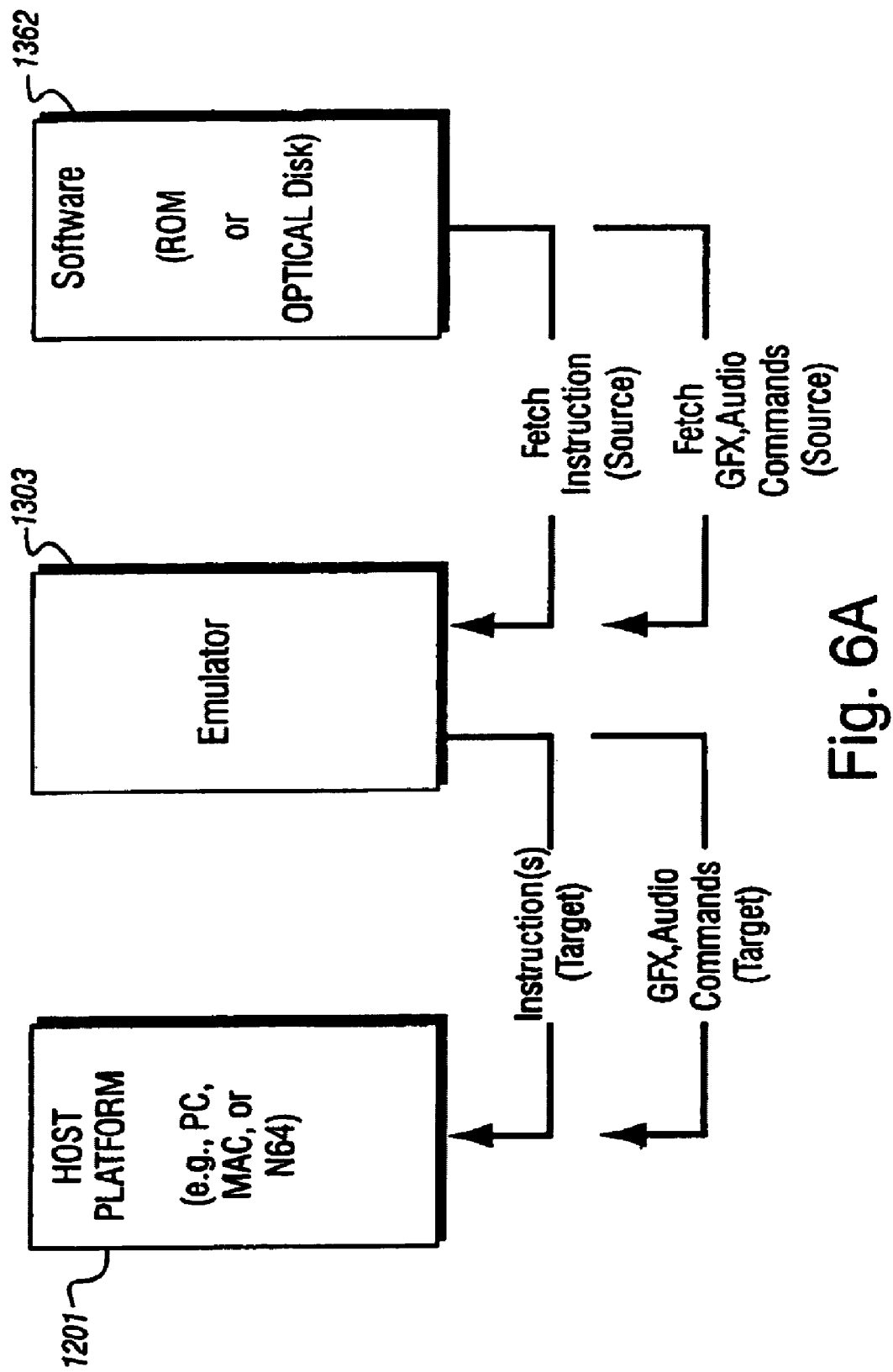
FIG. 6A illustrates an example overall emulation process.

FIG. 6A illustrates an example overall emulation process using a host platform 1201, an emulator component 1303, and a game software executable binary image provided on a storage medium 1362. Host 1201 may be a general or special purpose digital computing device such as, for example, a personal computer, a laptop computer, a palm-top computer, a video game console, a portable game machine, a personal digital assistant, an internet appliance, a set-top box, or any other platform with sufficient computing power. Emulator 1303 may be software and/or hardware that runs on host platform 1201, and provides a real-time conversion of commands, data and other information from storage medium 1362 into a form that can be processed by host 1201. For example, emulator 1303 fetches "source" binary-image program instructions intended for execution by portable game machine 110 from storage medium 1362 and converts these program instructions to a target format that can be executed or otherwise processed by host 1201.

As one example, in the case where the software is written for execution on a platform using a specific processor and the host 1201 is a personal computer using a different (e.g., Intel) processor, emulator 1203 fetches one or a sequence of binary-image program instructions from storage medium 1362 and converts these program instructions to one or more equivalent Intel binary-image program instructions. The emulator 1203 also fetches and/or generates graphics commands and audio commands, and converts these commands into a format or formats that can be processed by hardware and/or software graphics and audio processing resources available on host 1201. As one example, emulator 1303 may convert these commands into commands that can be processed by specific graphics and/or or sound hardware of the host 1201 (e.g., using standard DirectX, OpenGL and/or sound APIs).

Figure 6B:
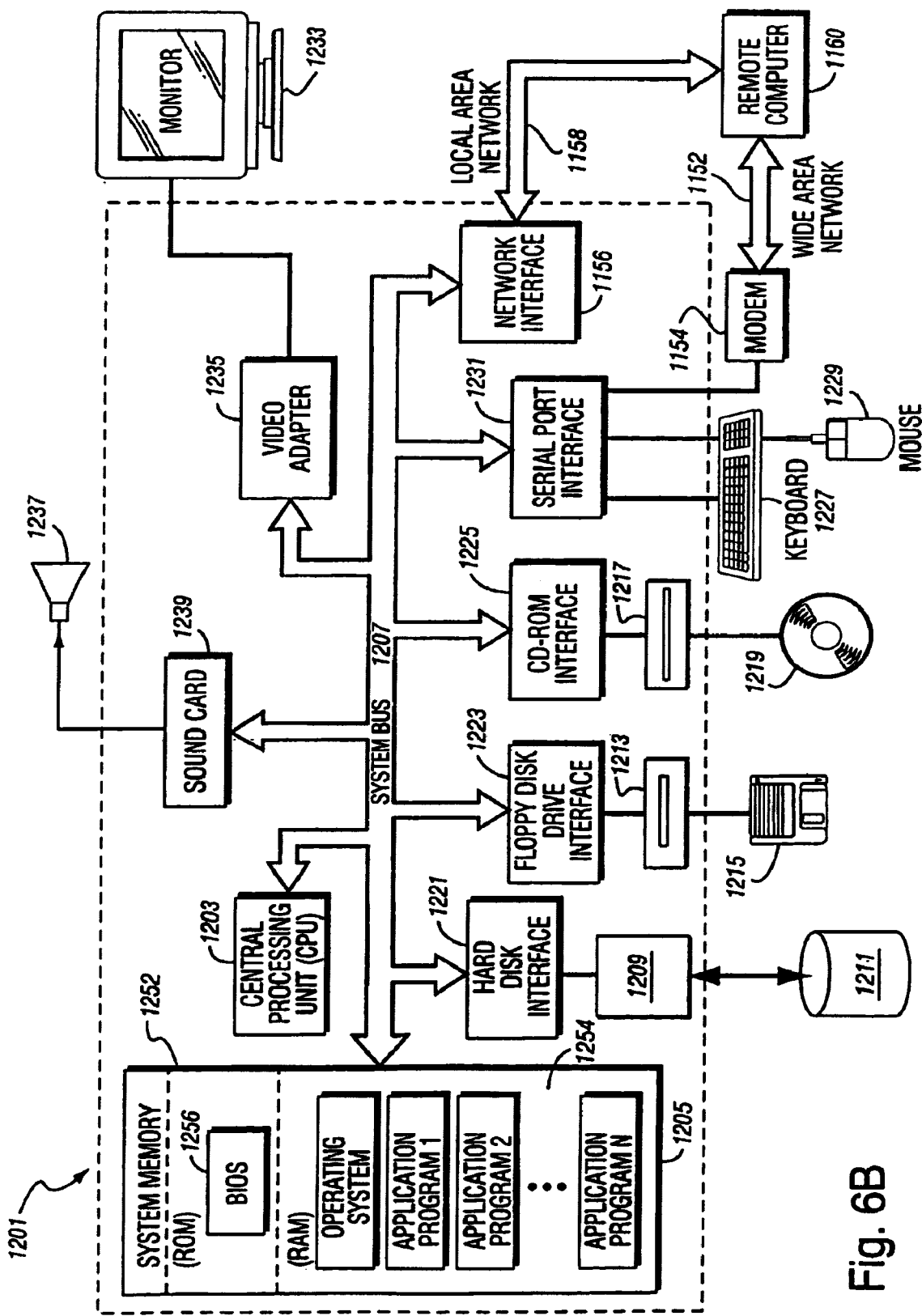
FIG. 6B illustrates one example emulation host system.

FIG. 6B illustrates one example emulation host system 1201 suitable for use with emulator 1303. System 1201 includes a processing unit 1203 and a system memory 1205. A system bus 1207 couples various system components including system memory 1205 to processing unit 1203. System bus 1207 may be any of several types of bus structures including a memory bus or memory controller, a peripheral bus, and a local bus using any of a variety of bus architectures. System memory 1207 includes read only memory (ROM) 1252 and random access memory (RAM) 1254. A basic input/output system (BIOS) 1256, containing the basic routines that help to transfer information between elements within personal computer system 1201, such as during start-up, is stored in the ROM 1252. System 1201 further includes various drives and associated computer-readable media. A hard disk drive 1209 reads from and writes to a (typically fixed) magnetic hard disk 1211. An additional (possibly optional) magnetic disk drive 1213 reads from and writes to a removable "floppy" or other magnetic disk 1215. An optical disk drive 1217 reads from and, in some configurations, writes to a removable optical disk 1219 such as a CD ROM or other optical media. Hard disk drive 1209, magnetic disk drive 1213, and optical disk drive 1217 are connected to system bus 1207 by a hard disk drive interface 1221, magnetic disk drive interface 1223, and an optical drive interface 1225, respectively. The drives and their associated computer-readable media provide nonvolatile storage of computer-readable instructions, data structures, program modules, game programs and other data for personal computer system 1201. In other configurations, other types of computer-readable media that can store data that is accessible by a computer (e.g., magnetic cassettes, flash memory cards, digital video disks, random access memories (RAMs), read only memories (ROMs) and the like) may also be used.

A number of program modules including emulator 1303 may be stored on the hard disk 1211, removable magnetic disk 1215, optical disk 1219 and/or the ROM 1252 and/or the RAM 1254 of system memory 1205: Such program modules may include an operating system providing graphics and sound APIs, one or more application programs, other program modules, program data and game data. A user may enter commands and information into personal computer system 1201 through input devices such as a keyboard 1227, pointing device 1229, microphones, joysticks, game controllers, satellite dishes, scanners, or the like. These and other input devices can be connected to processing unit 1203 through a serial port interface 1231 that is coupled to system bus 1207, but may be connected by other interfaces, such as a parallel port, game port, Fire wire bus or a universal serial bus (USB). A monitor 1233 or other type of display device is also connected to system bus 1207 via an interface, such as a video adapter 1235.

System 1201 may also include a modem 1154 or other network interface means for establishing communications over a network 1152 such as the Internet. Modem 1154, which may be internal or external, is connected to system bus 123 via serial port interface 1231. A network interface 1156 may also be provided for allowing system 1201 to communicate with a remote computing device 1150 (e.g., another system 1201) via a local area network 1158 (or such communication may be via wide area network 1152 or other communications path such as dial-up or other communications means). System 1201 will typically include other peripheral output devices, such as printers and other standard peripheral devices.

In one example, video adapter 1235 may include a 3D graphics pipeline chip set providing fast 3D graphics rendering in response to 3D graphics commands issued based on a standard 3D graphics application programmer interface such as Microsoft's DirectX 7.0 or other version. A set of stereo loudspeakers 1237 is also connected to system bus 1207 via a sound generating interface such as a conventional "sound card" providing hardware and embedded software support for generating high quality stereophonic sound based on sound commands provided by bus 1207. These hardware capabilities allow system 1201 to provide sufficient graphics and sound speed performance to play software stored in storage medium 1362.

An emulator 1303 used to provide some or all of the features of the video game system described above may also be provided with a graphic user interface (GUI) that simplifies or automates the selection of various options and screen modes for games run using the emulator. In one example, such an emulator 1303 may further include enhanced functionality as compared with the host platform for which the software was originally intended.

FIG. 6C illustrates another example emulation host system 1201' suitable for use with emulator 1303. The emulation host system in FIG. 6C is generally configured along the lines of a personal digital assistant such as those available from Palm Inc., Handpsring, Inc. and Sony and running an operating system such as Windows CE, EPOC or PalmOS. Typically, such personal digital assistants provide capabilities for a diary/scheduler, to-do lists, phone/address books and the like. System 1201' includes a processing unit 1503 and memory 1505. A system bus 1507 couples various system components including memory 1505 to processing unit 1503. Memory 1505 includes read only memory (ROM) and random access memory (RAM). Memory 1505 may also include external memory in the form of memory cards or memory sticks inserted into a suitable port provided in the housing for the components of system 1201'. A touch-sensitive display screen (e.g., a touch-sensitive liquid crystal display screen) 1509 is also connected to system bus 1507 via an interface 1511. Inputs via touch-sensitive screen 1509 are typically made using a stylus. Other input devices 1513 such as pushbuttons, switches, pointing devices and the like are also connected to system bus 1507 via an interface 1515. The input devices may also include external keyboards or game control devices (e.g., joystick, game controller). The input devices may be used as game controls (e.g., starting the game, character movement, character action, etc.) when system 1201' is used with emulator 1303. Games may be written to memory 1505 using communication circuit 1521 which may take the form of a modem for downloading the game from the Internet, for example, or of a cradle (e.g., a USB cradle) for connecting system 1201' to a personal computer.

One or more speakers 1517 are connected to system bus 1507 via an audio interface 1519 to output sounds. A communication circuit 1521 is connected to system bus 1507 via a communications interface 1523 to permit communication with other devices. By way of illustration, communication circuit 1521 may, for example, be a modem and communications interface 1523 may be a serial port. Generally speaking, communication circuit 1521 may be configured for wired or wireless communication in accordance with any conventional communication protocol. A power supply 1525 provides power for the components of system 1201'.

Any patent documents mentioned above are hereby incorporated by reference into the present application.

Although the present invention has been described and illustrated in detail, this description is for illustrative purposes only and is not to be construed as limiting the present invention.

We claim:

1. A messaging system comprising:
    a web server computer; and
    a video game system for executing a video game program for a video game, the video game program being embodied on a storage device replaceably connectable by a user to the video game system and comprising program instructions for both the video game and for a messaging service client, whereby the messaging service client is activated by connecting the storage device to the video game system and executing the video game program embodied thereon, the activated messaging service client establishing a connection between the video game system and said web server computer via the Internet and sending status data from the video game system to said web server computer that is indicative of the video game program being executed by the video game system,
    wherein said web server computer generates a session file when the video game system connects thereto, the session file comprising the status data sent from the video game system and status data indicative of video game programs being executed by video game systems of each of one or more buddies identified on a buddy list previously defined by the user,
    wherein the status data of the one or more buddies on the buddy list is accessible to the user even if the video game system of the user and the video game systems of the one or more buddies are executing video game programs for playing different games.

2. The system according to claim 1, wherein the status data for each buddy further indicates whether that buddy is online and able to send/receive messages.

3. The system according to claim 1, wherein the status data for each buddy further indicates whether that buddy is online, but not able to send/receive messages.

4. The system according to claim 1, wherein the status data for each buddy further indicates whether that buddy is online and able to send, but not receive, messages.

5. The system according to claim 1, wherein the web server computer stores a user profile for the user.

6. The system according to claim 5, wherein the user can configure accessibility of the user's profile to others.

7. The system according to claim 5, wherein a system administrator can configure accessibility of the user's profile to others.

8. The system according to claim 1, wherein said web server computer is responsive to a user-supplied request for communicating to the user an identification of all buddy lists on which the user appears.

9. The system according to claim 8, wherein said web server computer is further responsive to a user-supplied request for deleting the user's name from one or more other user's buddy lists.

10. A messaging service client incorporated into a video game program for a video game that is embodied on a storage device that is replaceably connectable to a video game machine for executing the video game program, the messaging service client being activated by executing the video game program and comprising instructions for:
    contacting a messaging server over a communication network;
    sending identities of the video game and a player playing the video game to the contacted messaging server;
    receiving from the contacted messaging server buddy list data for one or more players on a buddy list previously defined by the player, the buddy list data comprising identities of other players and games that the other players are playing; and
    generating a display based on the received buddy list data, the display comprising the identities of one or more of the other players and the games the one or more other players are playing.

11. The messaging service client according to claim 10, comprising further instructions for:
    receiving a message from another player while the player is playing the video game.

12. The messaging service client according to claim 11, comprising further instructions for:
    providing a prompt to the player that the message has been received.

13. The messaging service client according to claim 12, comprising further instructions for:
    suspending playing of the video game and displaying the message in response to one or more player inputs.

14. The messaging service client according to claim 10, comprising further instructions for:
    receiving email notifications from the player's e-mail service indicating that e-mail messages have been received.

15. The messaging service client according to claim 10, comprising further instructions for:
    receiving and storing player preference data that is referenced when the messaging service client is executed.

16. The messaging service client according to claim 10, comprising further instructions for:
    generating the buddy list in response to inputs from the player.

17. The messaging service client according to claim 10, wherein the storage medium comprises a portable storage medium.

18. A server process for a game network server embodied on a storage device and comprising instructions executable by a server processing system for:
    receiving identifiers of players and video games played by the players from a plurality of game machines executing respective video game programs each embodied on a replaceably connectable storage device, the respective video game programs each comprising program instructions both for a video game and for a messaging service client, whereby the messaging client is activated by connecting the storage device to a corresponding game machine and executing the video game program;
    logging the players onto the game network server;
    for each of one or more of the logged-on players, determining whether that logged-on player has a previously-defined buddy list of other players and, if so, determining which players on the buddy list are currently logged-in and what games those players are playing; and
    sending to each of the one or more logged-on players, the identities of the players on the buddy list that are currently logged-in and the games that those players are playing.

19. The server process according to claim 18, comprising further instructions executable by the server processing system for:

supplying messages received from one logged-in player to another logged-in player.

20. The server process according to claim 18, comprising further instructions executable by the server processing system for:

setting up text-based chat sessions between two or more logged-in players.

21. The server process according to claim 18, comprising further instructions executable by the server processing system for:

setting up voice-based chat sessions between two or more logged-in players.

22. A game network server configured to execute the server process according to claim 18.

* * * * *